United States Patent
Kippley et al.

(10) Patent No.: US 7,694,053 B2
(45) Date of Patent: Apr. 6, 2010

(54) SLAVE ASSEMBLY FOR DETERMINING SOURCE OF DATA RECEIVED OVER A TWO-WIRE MASTER-SLAVE COMMUNICATIONS BUS

(75) Inventors: Robert H. Kippley, Eagan, MN (US); Evan Lucore, Hopkins, MN (US)

(73) Assignee: Astec International Limited, Kwun Tong, Kowloon (HK)

( * ) Notice: Subject to any disclaimer, the term of this patent is extended or adjusted under 35 U.S.C. 154(b) by 86 days.

(21) Appl. No.: 12/102,499

(22) Filed: Apr. 14, 2008

(65) Prior Publication Data

US 2009/0257444 A1    Oct. 15, 2009

(51) Int. Cl.
G06F 13/00    (2006.01)
(52) U.S. Cl. .................................. 710/110; 713/600
(58) Field of Classification Search ................ 710/110, 710/305; 713/600
See application file for complete search history.

(56) References Cited

U.S. PATENT DOCUMENTS

| | | | |
|---|---|---|---|
| 5,758,098 A * | 5/1998 | Townsley et al. ............ 710/301 |
| 6,629,172 B1 * | 9/2003 | Andersson et al. .......... 710/104 |
| 6,636,924 B1 * | 10/2003 | Anderson .................... 710/305 |
| 7,240,130 B2 * | 7/2007 | Larson et al. ................. 710/29 |
| 7,380,042 B2 * | 5/2008 | Wang et al. .................. 710/305 |
| 7,519,886 B2 * | 4/2009 | Tsao et al. ................... 714/733 |
| 2004/0019720 A1 * | 1/2004 | Trembley .................... 710/110 |
| 2005/0212908 A1 * | 9/2005 | Rodman et al. .......... 348/14.08 |

FOREIGN PATENT DOCUMENTS

JP    2000121865 A  *  4/2000

* cited by examiner

*Primary Examiner*—Paul R Myers
(74) *Attorney, Agent, or Firm*—Harness, Dickey & Pierce, P.L.C.

(57) ABSTRACT

A method of determining a source of data received over a two-wire master-slave communication bus includes monitoring with a slave assembly a plurality of clock signals each generated by a master device and determining the source of data received over the two-wire master-slave communication bus based on the monitored clock signals. Examples of suitable slave assemblies and systems for performing the method are also disclosed.

18 Claims, 4 Drawing Sheets

SLAVE ASSEMBLY FOR DETERMINING SOURCE OF DATA RECEIVED OVER A TWO-WIRE MASTER-SLAVE COMMUNICATIONS BUS

FIELD

The present disclosure relates to two-wire master-slave communications.

BACKGROUND

The statements in this section merely provide background information related to the present disclosure and may not constitute prior art.

Numerous bus systems exist for communication between two or more electrical devices or components. One common type of bus system is a two-wire serial bus.

FIG. 1 is a diagram of an example two-wire communication configuration, generally indicated by the reference numeral 100, suitable for inter-integrated circuit (I2C), Serial Peripheral Interface (SPI) and Serial Communications Interface (SCI) communications protocols. All of the clock outputs 102a-102n from a plurality of master devices 104a-104n are commonly coupled to a single clock input port 106 in a slave device 108. Similarly, all of the data outputs 110a-110n from the master devices 104a-104n are commonly coupled to a single data input port 112 of the slave device 108.

Using such a configuration, the slave device 108 is unable to determine which master device 104a-104n is sending data to the slave device 108. The slave device 108 only knows that it is receiving data from a master device 104a-104n. It does not know from which master device 104a-104n it is receiving data, or whether there is more than one master device. Likewise, the slave device 108 is unable to determine if any of the master devices 104a-104n are coupled more than one time to the slave device 108. To overcome these deficiencies, a third line, known as a slave select line, is often added to instruct the slave device 108 which master device 104a-104n is communicating with the slave device 108. This requires additional lines between the master devices 104a-104n and slave devices 108 and increases the expense and complexity of the circuit. Alternatively, a unique identifier can be transmitted to identify from which master device 104a-104n data is being sent. This option, however, increases the complexity of the master devices 104a-104n and the slave devices 108, requires tight control over the unique identifiers, increases the amount of data being sent and/or limits the variability and scalability of the system.

SUMMARY

According to one aspect of the present disclosure, a method is provided for determining a source of data received over a two-wire master-slave communication bus. The method includes monitoring with a slave assembly each of a plurality of clock signals, where each clock signal is generated by a master device, and determining the source of data received over the two-wire master-slave communication bus based on the monitored clock signals.

According to another aspect of the present disclosure, a slave assembly for a two-wire master-slave communication system is disclosed. The slave assembly includes a plurality of assembly input ports, a monitoring device, and a slave device operatively coupled to the monitoring device. Each assembly input port includes an assembly data input and an assembly clock input. The monitoring device includes a plurality of monitoring inputs, and the slave device includes a slave data input. The plurality of assembly clock inputs are independently coupled to one of the monitoring inputs. The slave assembly is configured to use the monitoring inputs to identify a source of data received at the slave data input.

According to yet another aspect of the present disclosure, a communication system includes at least one master device and a slave assembly. The slave assembly includes a plurality of assembly input ports, a monitoring device and a slave device operatively coupled to the monitoring device. Each assembly input port includes an assembly data input and an assembly clock input. The monitoring device includes a plurality of monitoring inputs. The plurality of assembly clock inputs are each coupled to a different one of the monitoring inputs. The slave device includes a slave data input with the plurality of assembly data inputs coupled to the slave data input. The master device includes a clock output and a data output each coupled to at least one of the assembly input ports. The slave assembly is configured to identify the source of data received at the slave data input.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

According to one aspect of this disclosure a method of implementing a multi-master two-wire communication bus includes monitoring, with a slave assembly, each of a plurality of clock signals. Each of the plurality of clock signals is generated by one of a plurality of master devices. The method further includes determining which of the master devices is switching based on the monitored clock signals. In this manner, the slave assembly may determine the source of data received over a two-wire communication bus without requiring a third wire or unique identifiers for each master device. As further explained below, the method may also include determining if data is arriving from unique master devices or a single master device coupled multiple times to the slave assembly. In some embodiments, the method includes separating each clock signal into an isolated clock signal and a common clock signal to facilitate determining which of the master devices is sending a data signal.

Examples of slave assemblies and systems suitable for practicing the method disclosed above will now be described with reference to FIGS. 2-4. It should be understood, however, that other slave assemblies and systems can be used to practice the disclosed method without departing from the scope of this disclosure.

Figure 1:
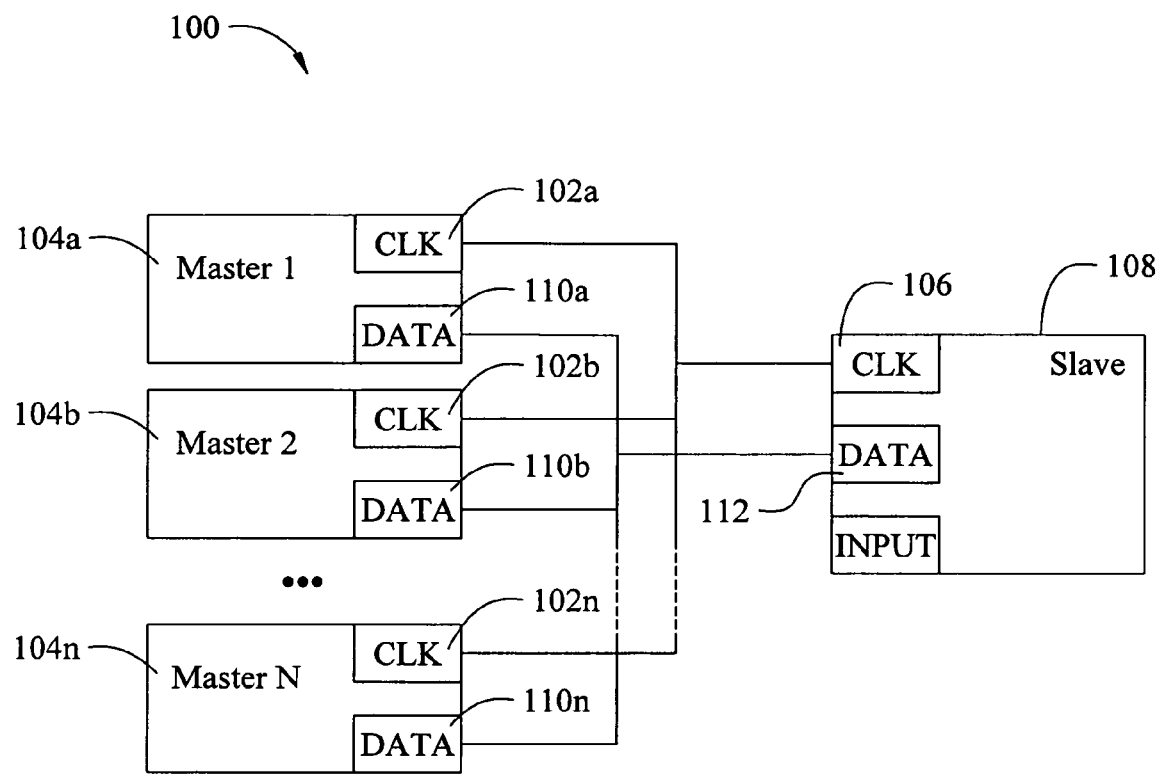
FIG. 1 is a block diagram of a two-wire multiple master communications system according to the prior art.
Figure 2:
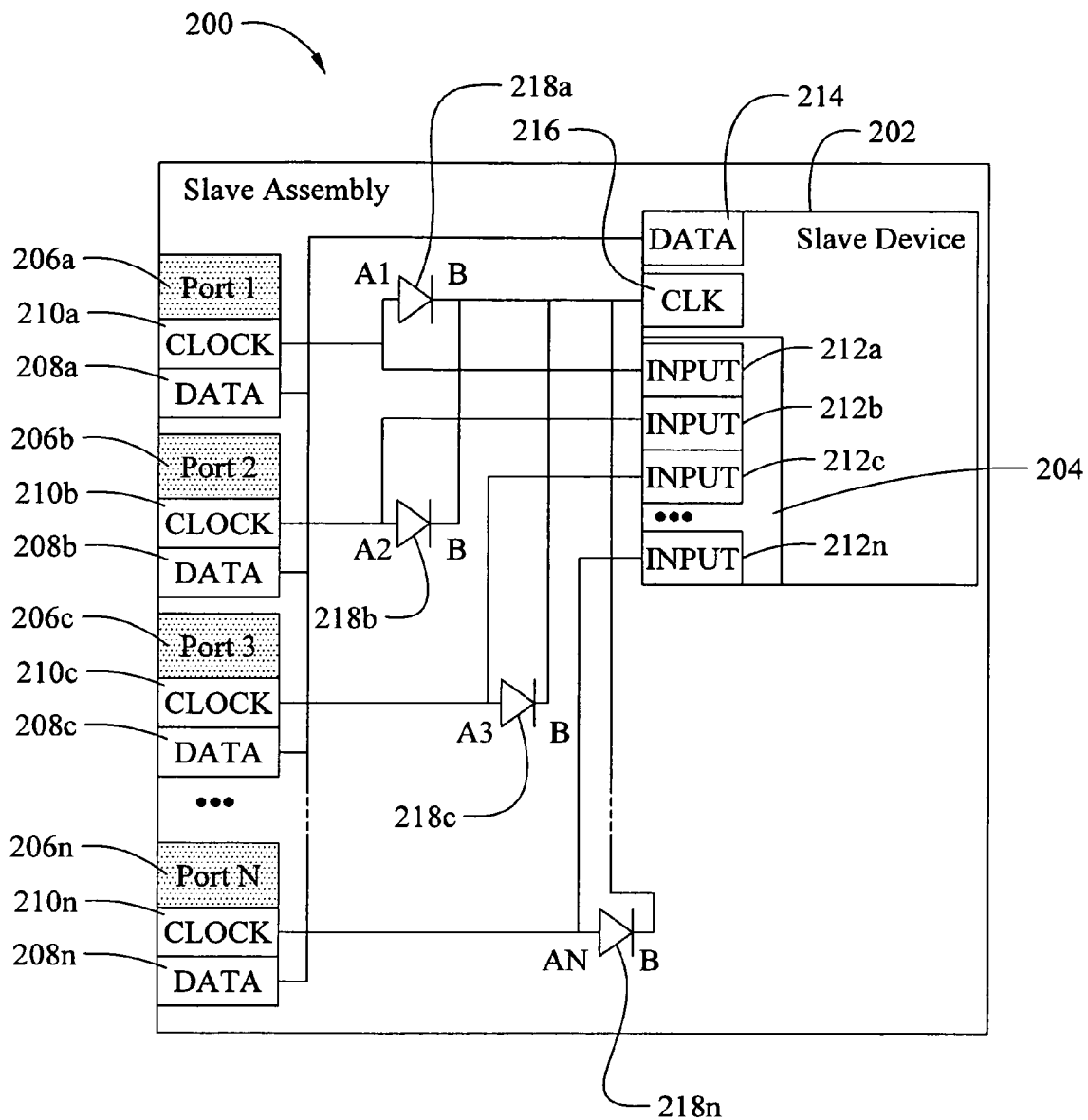
FIG. 2 is a block diagram of a slave assembly configured for determining a source of data received over a two-wire master-slave communications bus according to one embodiment of this disclosure.
Figure 3:
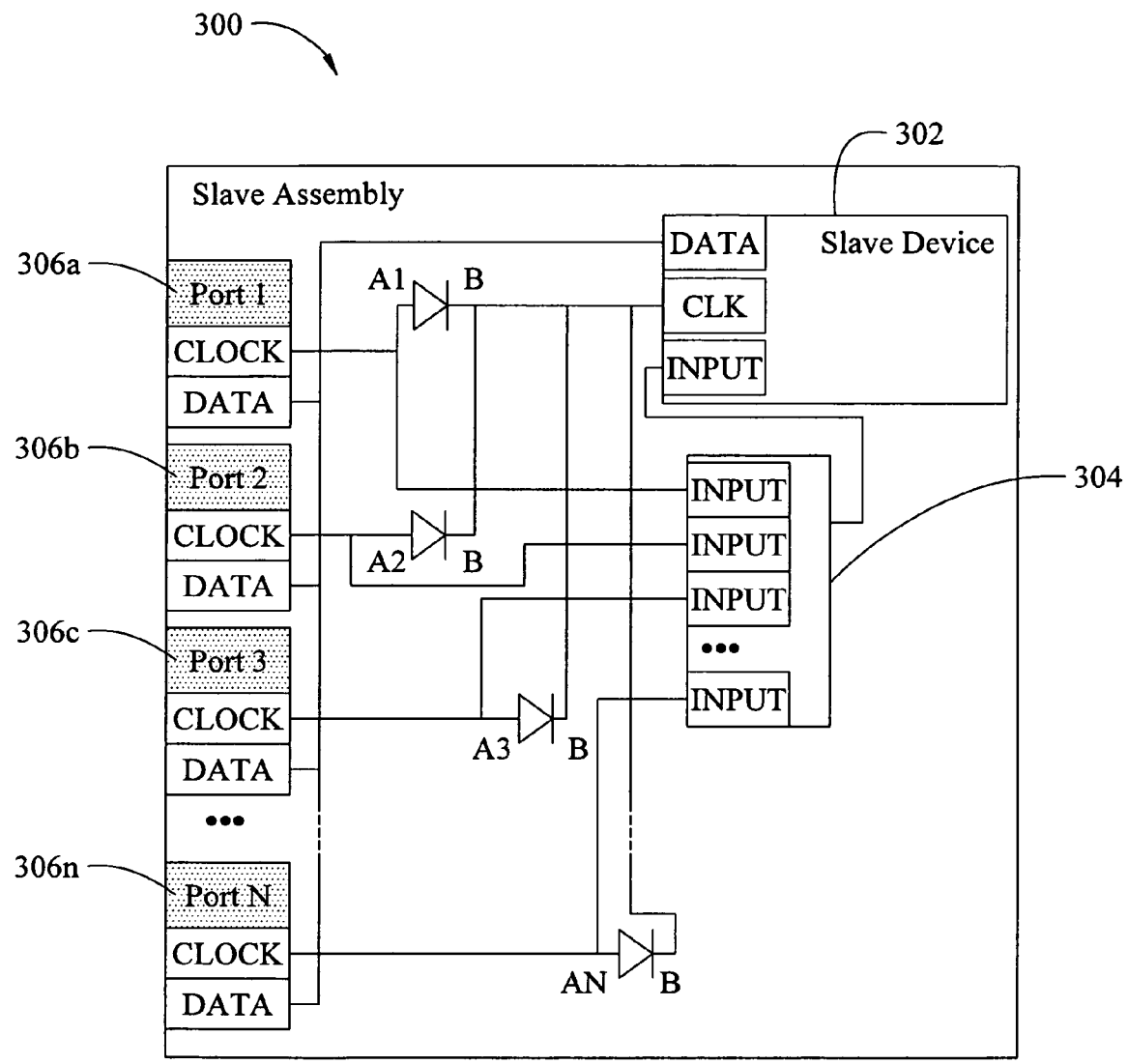
FIG. 3 is block diagram of a slave assembly according to another embodiment of this disclosure in which the slave assembly includes a slave device and a separate monitoring device.

A slave assembly according to one embodiment of this disclosure is illustrated in FIG. 2 and indicated generally by reference numeral 200. As shown in FIG. 2, the slave assembly 200 includes a slave device 202, a monitoring device 204 within the slave device 202, and a plurality of assembly input ports 206a-206n. Each assembly input port includes an assembly data input 208a-208n and an assembly clock input 210a-210n. The monitoring device 204 includes a plurality of monitoring inputs 212a-212n. The slave device 202 includes a slave data input 214. Each assembly clock input 210a-210n is independently coupled to one of the monitoring inputs 212a-212n and the slave assembly 200 is configured to use the monitoring inputs 212a-212n to identify the source of data received at the slave data input 214.

The slave device 202 can be any device capable of utilizing a two-wire communication protocol and may include, for example, a microcontroller, an Application Specific Integrated Circuit (ASIC), a computer server, or a personal computer (PC). Additionally, the slave device 202 may include a Field Programmable Grid Array (FPGA) or other digital logic configured to utilize a two-wire communications protocol.

As shown in FIG. 2, the assembly data inputs 208a-208n are commonly coupled to the slave data input 214. Thus, data received at any of the assembly data inputs 208a-208n will be received at the slave data input 214. As discussed above, the received data does not indicate to the slave device 202 from which assembly input port 206a-206n the data was received. Because each assembly clock input 210a-210n is independently coupled to one of the monitoring inputs 212a-212n, the slave assembly 200 can determine from which assembly input port (and thus which master device) the data was transmitted by monitoring the monitoring inputs 212a-212n.

Additionally, each assembly clock input 210a-210n is commonly coupled to a slave clock input 216. When a master device is coupled to the slave assembly 200, the master device sends a data signal and a clock signal at the same time. Upon receiving the clock signal via the slave clock input 216, the slave assembly 200 samples the data signal via the data signal input 214.

In FIG. 2, the common coupling of the assembly clock inputs 210a-210n to the slave clock input 216 is isolated from the independent coupling of each assembly clock input 210a-210n to one of the monitoring inputs 212a-212n by isolation devices 218a-218n coupled between the assembly clock inputs 210a-210n and the slave clock input 216. The isolation devices 218a-218n allow signals to pass in only one direction. In this particular embodiment the isolation devices 218a-218n only allow signals to pass in the direction from the assembly clock inputs 210a-210n to the slave clock input 216. In the particular embodiment of FIG. 2, the isolation devices 218a-218n are diodes. However, one skilled in the art will realize that isolation devices 218a-218n are not so limited and any device capable of isolating clock signals as discussed herein can be used as an isolation device.

Alternatively, the monitoring device 204 could combine the clock signals provided to the monitoring inputs 212a-212n into a common clock signal and provide the common clock signal to the slave device 202. This common clock signal can be provided internally within the slave assembly 200, or may be provided from the monitoring device 204 to the slave clock input 216. In either such use, the isolation elements 218a-218n can be eliminated. Additionally, if the common clock signal is provided internally within the slave assembly 200, the slave clock input 216 can also be eliminated.

Although included as part of the slave device 202 in the slave assembly 200 of FIG. 2, the monitoring device 204 can also be separate from the slave device 202. As illustrated in FIG. 3, a slave assembly 300 includes a slave device 302, a monitoring device 304 and a plurality of assembly input ports 306a-306n. The monitoring device 304 is physically separate, but still communicatively coupled to, the slave device 302. The slave assembly 300 of FIG. 3 essentially operates in the same manner discussed above. In some embodiments, the slave assembly 300 may include control logic allowing the monitoring assembly to control and/or communicate with the slave device 302. Such control logic may be internal to, or separate from, the monitoring assembly.

One embodiment of a two-wire communication system 400 including a slave assembly 401 operable according to the method described above is illustrated in FIG. 4. The system includes a plurality of master devices 422a-422n. Each master device has a clock output 424a-424n and a data output 426a-426n. The slave assembly 401 includes a slave device 402, a monitoring device 404 and a plurality of assembly input ports 406a-406n. The master devices 422a-422n are each coupled to at least one of the assembly input ports 406a-406n of the slave assembly 401 via the clock outputs 424a-424n and the data outputs 426a-426n. Each of the assembly input ports 406a-406n includes an assembly data input 408a-408n and an assembly clock input 410a-410n. The slave device 402 includes a slave data input 414 and each assembly data input 408a-408n is coupled to the slave data input 414. The slave assembly 401 is configured to identify the source of data received at the slave data input 414.

As with the slave assemblies 300 and 200, the monitoring device 404 includes a plurality monitoring inputs 412a-412n. Further, the slave device 402 includes a slave clock input 416. The assembly clock inputs 410a-410n are commonly coupled to the slave clock input 416 and each assembly clock input 410a-410n is independently coupled to a different one of the plurality of monitoring inputs 412a-412n. Isolation devices 418a-418n are located between the assembly clock inputs 410a-410n and the slave clock input 416.

This system allows the slave assembly 401 to identify the source of data received at the slave data input 414 by monitoring clock signals received via the monitoring inputs 412a-412n. In operation, a master device transmits a clock signal via the clock output 424a-424n and a data signal via the data output 426a-426n. The clock signal is provided to the slave clock input 416 and one of the monitoring inputs 412a-412n, while the data signal is provided to the slave data input 414. As mentioned above, the isolation devices 418a-418n prevent the clock signal applied to the slave clock input 416 from appearing at the monitoring inputs 412a-412n. The slave assembly 401 samples the data signal in response to the clock signal received at the slave clock input 416. The slave device 402 also determines on which of the monitoring inputs 412a-412n the clock signal is also present. From this determination, the slave assembly 401 can determine which of the master devices 422a-422n transmitted the data signal. For example, in the system of FIG. 4, if a clock signal is present on the slave clock input 416 and monitoring input 412c, the slave assembly 401 determines that the data signal was transmitted by master device 422b.

In addition, the slave device 402 can determine if the received data signals are arriving from a unique master device coupled to a single assembly input port, a single master device coupled to multiple assembly input ports 406a-406n, or any combination thereof. If unique master devices 422a-422n are coupled to each assembly port, sometimes called singly coupled, the clock signals received at the monitoring inputs 412a-412n will differ in time. If the clock signals at two different monitoring inputs 412a-412n switch at the same time, then a single master device is coupled to two assembly ports, sometimes called doubly coupled. In FIG. 4, master devices 422b and 422n are singly coupled, while master device 422a is doubly coupled.

Such ability to determine how many master devices 422a-422n are coupled to the slave assembly 401 and how they are coupled increases the flexibility of a system. The slave device 402 can be configured to respond one way when a master is singly coupled to the slave assembly 401 and to respond a second way when a master is doubly coupled to the slave assembly 401. If a clock signal appears on only one monitoring input, the slave device 402 knows that the master device, such as 422b, sending the data signal is coupled to only one assembly port and responds in the first way. If the clock signals on two different monitoring inputs 412a-412n switch at the same time, the slave device 402 knows that a single master device, such as 422a, is coupled to two different assembly ports and responds in the second way. Finally, if the clock signals on two different monitoring inputs 412a-412n switch at the different times, the slave device 402 knows that two master devices 422a-422n are singly coupled to the two different assembly input ports 406a-406n and can respond accordingly. Alternatively, or additionally, the slave device 402 could be configured to perform different functions, operations or modes depending on the connection configuration, e.g. singly or doubly coupled, of the master devices 422a-422n. The possible connection configurations are also not limited to the single and double connections illustrated and described herein. Other connection configurations, e.g. triply coupled, and other slave device 402 responses are possible.

Additionally, in some situations it may be desirable to know the total number of master devices 422a-422n coupled to a slave assembly 401 or, alternatively, how many are not coupled to a slave assembly 401. As described above, the slave device 402 can easily determine how many master devices 422a-422n are coupled to the slave assembly 401 and in what configuration. Similarly, if the slave device 402 knows how many assembly input ports 406a-406n are present, the slave device 402 can easily determine, by the absence of clock signals on some of the monitoring inputs 412a-412n, how many assembly ports are unused. Alternate configurations and/or operations may be performed by the slave device 402 depending on how many unused assembly input ports 406a-406n there are in the slave assembly 401. Additionally, such information may be provided to an external device, to allow a user and/or the external device to determine how many unused assembly input ports 406a-406n are available in the system.

In one example embodiment, the two-wire communication system 400 is implemented in a distributed power system. Master devices 422a-422n are used to control distribution of a single high power source through slave assembly 401 modules. If the slave device 402 only senses a clock signal on one monitoring input during transmission of a data signal, the system is non-redundant and the slave device 402 limits its output power to 300 Watts. If, instead, the slave device 402 senses a doubly coupled master device, i.e. it senses a clock signal on multiple monitoring inputs 412a-412n during transmission of a data signal, it increases its power output to 600 Watts. Finally, if the slave device 402 senses clock signals on multiple monitoring inputs 412a-412n, but the clock signals are not present at the same time, the slave device 402 knows that more than one master device is coupled and each is singly coupled to the slave assembly 401. Therefore, the system is set up in a redundant configuration and the slave assembly 401 limits the output power to 300 Watts.

The two-wire communication system 400 allows master devices 422a-422n to be used interchangeably and without the master device knowing that it is in, or being specially configured for, a multiple master device configuration. The master device does not need to send a unique identification code or trigger a slave select line. The master device simply sends the data and a clock signal. Therefore, a master device for a single master environment can be used in the multiple master configuration. Similarly, the slave assembly 401 can be used with any number of master devices 422a-422n, including only one master device. The number of master devices 422a-422n is limited only by the number of assembly input ports 406a-406n and monitoring inputs 412a-412n available in the slave assembly 401. Additionally, or alternatively, one or more master devices 422a-422n may be coupled to multiple slave assemblies or slave devices. The multiple slave devices can be part of a single slave assembly 401, or may be each included in a separate slave assembly 401. In such a multiple slave configuration, multiple slave devices can receive the same data from one or more master devices, but each perform different operations in response to, or utilizing, the received data. This allows multiple operations to be performed simultaneously rather than sequentially. The two-wire communication system 400 may also be configured several different ways to include master arbitration. Before sending a data signal and a clock signal, a master device can simply check for a switching clock line. If a switching clock line is detected, the master device waits for a period of time and again checks for a switching clock line. Alternatively, the slave device 402 can pull down the data lines of all the master devices 422a-422n except the communicating master device's data line and release the data lines when the communication is done. The release of the data lines provides a stop condition to the other master devices 422a-422n indicating the bus is available. Such a configuration can be realized using a multiplexer. The multiplexer will pull down all data lines to zero except the selected data line from the communicating master device. Additionally, the two wire communication system may be configured to allow the slave device 402 to provide master arbitration. The slave device 402 can select the master device from which it would like to receive data and pull down the data lines from all other master devices 422a-422n. Thus, only the master device from which the slave device 402 desires data is able to transmit data to the slave device 402.

Figure 4:
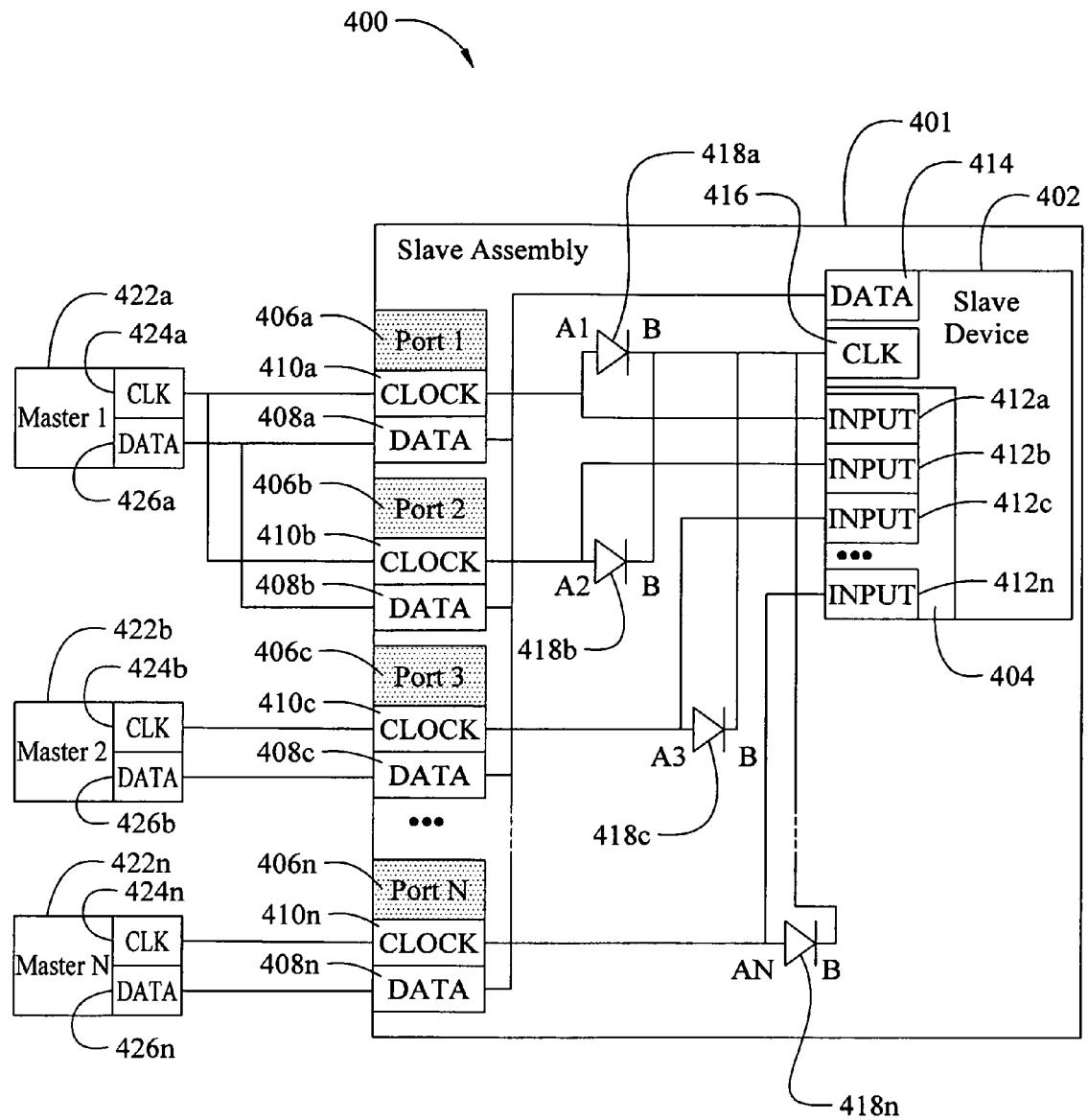
FIG. 4 is a block diagram of two-wire multiple master communications system including a slave assembly configured for determining a source of data received over a two-wire master-slave communications bus.

The slave assembly 401 is illustrated in FIG. 4 as a single integrated device including multiple component parts, e.g. slave device 402, assembly input ports 406a-406n, monitoring device 404, etc., and may be an integrated circuit. However, the slave assembly 401 may also be made of discrete components. Alternatively, or additionally, the slave assembly 401 may be a combination of integrated circuits and discrete components.

Certain terminology is used herein for purposes of reference only, and thus is not intended to be limiting. For example, the terms "first", "second" and other such numerical terms referring to structures do not imply a sequence or order unless clearly indicated by the context. Such terminology may include the words specifically mentioned above, derivatives thereof, and words of similar import.

When introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A slave assembly for a two-wire master-slave communication system, the slave assembly comprising a plurality of assembly input ports, a monitoring device, and a slave device operatively coupled to the monitoring device, each assembly input port including an assembly data input and an assembly clock input, the monitoring device including a plurality of monitoring inputs, and the slave device including a slave data input, the plurality of assembly clock inputs being independently coupled to one of the monitoring inputs, the slave assembly configured to use the monitoring inputs to identify a source of data received at the slave data input.

2. The slave assembly of claim 1 wherein the plurality of assembly data inputs are commonly coupled to the slave data input.

3. The slave assembly of claim 2 wherein the slave device includes a slave clock input and the plurality of assembly clock inputs are commonly coupled to the slave clock input.

4. The slave assembly of claim 3 further comprising a plurality of isolation devices, each assembly clock input being commonly coupled to the slave clock input through one of the isolation devices.

5. The slave assembly of claim 4 wherein the isolation devices are diodes.

6. The slave assembly of claim 5 wherein the anode of each diode is coupled to one of the assembly clock inputs and the cathode of each diode is coupled to the slave clock input.

7. The slave assembly of claim 3 wherein the slave device is configured to determine whether two or more of the monitoring inputs are switching at the same time to thereby determine whether a single master device is coupled to two or more of the assembly input ports.

8. The slave assembly of claim 7 wherein the slave device is a power supply configured to output a first power level upon sensing only one or more singly-coupled master devices, and to output a second power level upon sensing one or more multi-coupled master devices.

9. The slave assembly of claim 2 wherein the slave device includes the monitoring device.

10. The slave assembly of claim 9 wherein the monitoring device includes a processor.

11. The slave assembly of claim 2 wherein the monitoring device includes a processor.

12. The slave assembly of claim 11 wherein the monitoring device includes logic to control the slave device as a function of the source of data received at the slave data input.

13. A communication system comprising at least one master device and a slave assembly, the slave assembly including a plurality of assembly input ports, a monitoring device and a slave device operatively coupled to the monitoring device, each assembly input port including an assembly data input and an assembly clock input, the monitoring device including a plurality of monitoring inputs, the plurality of assembly clock inputs each coupled to a different one of the monitoring inputs, the slave device including a slave data input, the plurality of assembly data inputs coupled to the slave data input, the master device including a clock output and a data output each coupled to at least one of the assembly input ports, and the slave assembly configured to identify the source of data received at the slave data input.

14. The system of claim 13 wherein the slave device includes a slave clock input and the plurality of assembly clock inputs are commonly coupled to the slave clock input.

15. The system of claim 14 wherein the slave assembly further comprises a plurality of isolation devices and each assembly clock input is coupled to the slave clock input via one of the isolation devices.

16. The system of claim 13 wherein the at least one master device includes a plurality of master devices and the slave device is configured to determine which of the plurality of master devices generated a data signal.

17. The system of claim 16 wherein the slave device is configured to determine which of the plurality of master devices generated a data signal by sampling clock signals received by the monitoring inputs.

18. The system of claim 13 wherein the slave device is configured to determine whether said at least one master device is coupled to a plurality of the assembly input ports.

* * * * *